April 10, 1951     W. C. BAKER     2,547,992
MECHANICALLY ACTUATED PIPE THREAD PROTECTOR
Filed March 11, 1949
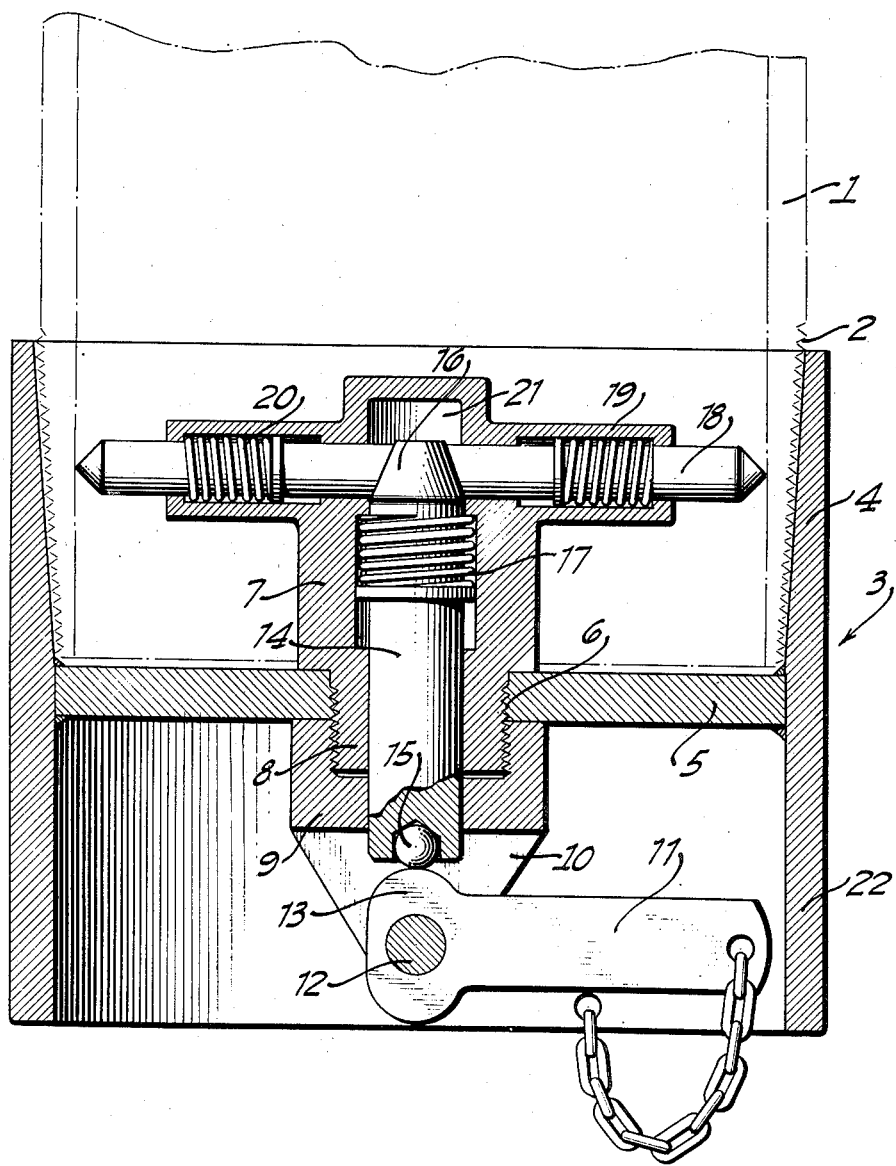
INVENTOR.
WILLIS C. BAKER,
BY
ATTORNEY.

Patented Apr. 10, 1951

2,547,992

UNITED STATES PATENT OFFICE 2,547,992

MECHANICALLY ACTUATED PIPE THREAD PROTECTOR

Willis C. Baker, Long Beach, Calif.

Application March 11, 1949, Serial No. 80,809

3 Claims. (Cl. 138—96)

This invention relates to a mechanically actuated pipe thread protector, whereby the threads of a stand of pipe are covered and protected while the pipe is being moved from one place to another, such as in the drilling or production of an oil well where the pipe is moved from the rack in the derrick to the bore of the well at the center of the derrick.

An object of my invention is to provide a novel mechanically actuated pipe thread protector, wherein pipe engaging pins are pressed outwardly into engagement with the pipe by the pressure of a tapered pin or cam.

Another object of my invention is to provide a novel mechanically actuated pipe thread protector of the character stated, in which the tapered pin or cam is manually operated to extend the pipe engaging pins.

A feature of my invention is to provide a device of the character stated, which is simple in construction and which can be quickly and easily placed on the pipe or removed therefrom and which will effectively remain in position under the stresses of moving the pipe from place to place.

Other objects, advantages and features of invention may appear from the accompanying drawing, the subjoined detailed description and the appended claims.

In the drawing the figure is a transverse sectional view of my mechanically actuated pipe thread protector.

This invention is a modification of my Pipe Thread Protector, filed November 24, 1947, Serial No. 787,736, now Patent No. 2,513,613.

Referring more particularly to the drawing, the end of pipe 1 is provided with external threads 2, and it is these threads which are protected and prevented from being battered or destroyed while the pipe is being moved from place to place.

My thread protector 3 consists of a sleeve 4, which fits over the threaded end of the pipe 1. The inner surface of the sleeve 4 is preferably plain, that is, it is not threaded, and the means to hold the protector in position will be subsequently described. The sleeve 4 has a transverse wall 5 provided therein, and this wall is formed with a central hole or opening 6.

To hold the sleeve 4 securely in position, on the pipe 1, the following structure is mounted within the sleeve: A cylinder 7 shoulders against the transverse wall 5 and the threaded end 8 of the cylinder 8 extends through the hole 6. A nut 9 screws on to the threaded end 8 of the cylinder 7 and also bears against the wall 5, thus securely holding the cylinder assembly in position.

A pair of ears 10 project from the nut 9 and a cam lever 11 is rotatably mounted between these ears on the pin 12. The pin is mounted in the ears 10 and the cam lever 11 is free to swing through approximately 180°. The lever 11 is provided with cams 13, which engage the end of the bar 14, substantially as shown. A ball 15 may be provided in the end of the bar 14 to engage the cam 13, thus eliminating some of the friction between the cam and the bar. The bar 14 is mounted in the upper end of the cylinder 7 and extends through the nut 9. The inner end of the bar 14 is formed with a tapered or cam surface 16. A spring 17, within the cylinder 7, bears against the bar 14 and normally presses this bar downwardly, that is, towards the cam lever 11.

A plurality of pipe engaging pins 18 are each mounted in the upper end of the cylinder 7 and project horizontal therefrom. These pins are each provided with suitably sharpened outer ends to engage the inner surface of the pipe 1, thus holding the entire thread protector assembly in position. The inner ends of the pins 18 bear against the tapered or cam surface 16, and as the bar is pressed into the cylinder 7 by the lever 11, the action of the surface 16 will press the pins 18 outwardly against the pipe and will partially embed the pins in the pipe.

The pins 18 extend from tubes 19, which project from the cylinder 7, and a spring 20, within the tubes, engages the pin 18 to tend to retract the pin. A space 21 is provided in the upper end of the cylinder 7 into which the bar 14 can move when the pins 18 are extended.

In operation, the cam lever 11 is moved approximately 90° from the position shown in the drawing so that the cams 13 are not engaging the end of the bar 14. The pins 18 are now retracted and the sleeve 4 is slipped over the threads of the pipe 1. The lever 11 is now swung into position shown. This moves the bar 14 into the cylinder 7 and causes the tapered or cam surface 16 to press the pins 18 outwardly to engage the pipe 1, substantially as shown.

A skirt 22 may be formed on the sleeve 4 to protect the lever 11 when it is in locking position and so that movement of the pipe will not accidentally dislodge the lever.

Having described my invention, I claim:

1. A mechanically actuated pipe thread protector comprising a sleeve, a transverse wall in the sleeve, a cylinder fixedly mounted on said wall, a bar reciprocally mounted in said cylinder, manual means mounted in said protector and engaging the bar to operate the same, and pipe engaging pins projecting from the cylinder and operable by said bar.

2. A mechanically actuated pipe thread protector comprising a sleeve, a transverse wall in the sleeve, a cylinder mounted on said wall, a bar reciprocally mounted in said cylinder, manual means engageable with said bar to actuate the same, a cam surface on the bar and pipe engaging pins projecting from the cylinder and bearing against said cam surface to actuate said pins.

3. A mechanically actuated pipe thread protector comprising a sleeve, a transverse wall in the sleeve, a cylinder mounted on said wall, a bar reciprocally mounted in said cylinder and projecting from one end thereof, a cam lever rotatably mounted adjacent the outer end of the bar and engaging the end of said bar to reciprocate the same, a cam surface on the bar and pipe engaging pins projecting from the cylinder and engaging the cam surface and operable thereby.

WILLIS C. BAKER.

REFERENCES CITED

The following references are of record in the file of this patent:

UNITED STATES PATENTS

| Number | Name | Date |
|---|---|---|
| 854,986 | De Weese | May 28, 1907 |
| 1,560,489 | Yager | Nov. 3, 1925 |
| 2,196,454 | Kahn et al. | Apr. 9, 1940 |